(12) United States Patent
Brown et al.

(10) Patent No.: US 10,976,511 B2
(45) Date of Patent: Apr. 13, 2021

(54) SYSTEM AND METHOD FOR FEEDING A CABLE INTO AN ENCLOSURE IN A SEALED AND ACCESSIBLE MANNER

(71) Applicant: CORNING RESEARCH & DEVELOPMENT CORPORATION, Corning, NY (US)

(72) Inventors: Jason James Brown, Keller, TX (US); William Julius McPhil Giraud, Azle, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/565,928

(22) Filed: Sep. 10, 2019

(65) Prior Publication Data

US 2020/0003981 A1 Jan. 2, 2020

Related U.S. Application Data

(63) Continuation-in-part of application No. PCT/US2019/024929, filed on Mar. 29, 2019.

(60) Provisional application No. 62/652,669, filed on Apr. 4, 2018.

(51) Int. Cl.
*G02B 6/44* (2006.01)

(52) U.S. Cl.
CPC .................... *G02B 6/4444* (2013.01)

(58) Field of Classification Search
CPC ............... G02B 6/4444; G02B 6/4452
See application file for complete search history.

(56) References Cited

U.S. PATENT DOCUMENTS

| | | | | |
|---|---|---|---|---|
| 5,071,220 A * | 12/1991 | Ruello | ............... | G02B 6/4447 385/135 |
| 6,378,498 B2 * | 4/2002 | Kohketsu | ............... | F02D 41/221 123/198 D |
| 6,792,191 B1 * | 9/2004 | Clapp, Jr. | ............ | G02B 6/4452 385/135 |
| 6,792,919 B2 | 9/2004 | Kohketsu et al. | | |
| 7,132,605 B2 * | 11/2006 | Holmberg | ............. | H02G 3/088 174/135 |
| 7,273,985 B2 * | 9/2007 | Holmberg | ............. | H02G 3/088 174/135 |

(Continued)

OTHER PUBLICATIONS

International Search Report and Written Opinion of the International Searching Authority; PCT/US2019/024929; dated Aug. 5, 2019; 14 Pages; European Patent Office.

*Primary Examiner* — Andrew Jordan
(74) *Attorney, Agent, or Firm* — Grant A. Gildehaus

(57) ABSTRACT

A method for passing a plurality of optical fibers into an enclosure configured to enclose in an interior thereof a plurality of optical communication connections may include accessing the interior of the enclosure. The method may also include separating a module plate associated with a floor of the enclosure to provide an opening between an exterior of the enclosure and the interior of the enclosure. The method may also include feeding the plurality of optical fibers through the opening and into the interior of the enclosure. The method may further include associating the module plate with the enclosure, such that the module plate at least partially defines an aperture through which the plurality of optical fibers pass from the exterior of the enclosure to the interior of the enclosure.

21 Claims, 13 Drawing Sheets

(56) References Cited

U.S. PATENT DOCUMENTS

| | | | | |
|---|---|---|---|---|
| 7,925,135 | B2* | 4/2011 | Mullaney | G02B 6/4477 |
| | | | | 385/126 |
| 7,937,818 | B2* | 5/2011 | Holmberg | H02G 3/088 |
| | | | | 174/50 |
| 7,970,249 | B2* | 6/2011 | Solheid | G02B 6/4447 |
| | | | | 385/134 |
| 9,188,760 | B2* | 11/2015 | Kowalczyk | G02B 6/4457 |
| 9,523,834 | B2* | 12/2016 | Kowalczyk | G02B 6/4457 |
| 9,581,271 | B2* | 2/2017 | Haynes | F16L 5/10 |
| 9,594,227 | B2* | 3/2017 | Schurmans | H01R 13/5221 |
| 9,791,653 | B2 | 10/2017 | Aznag et al. | |
| 10,365,449 | B2 | 7/2019 | Thompson et al. | |
| 10,436,999 | B2 | 10/2019 | Amaya Cruz et al. | |
| 10,444,455 | B2* | 10/2019 | Aznag | G02B 6/4444 |
| 10,520,695 | B2* | 12/2019 | Jaksons | G02B 6/4452 |
| 2002/0002964 | A1* | 1/2002 | Kohketsu | F02D 41/3836 |
| | | | | 123/447 |
| 2002/0092504 | A1* | 7/2002 | Kohketsu | F02D 41/3827 |
| | | | | 123/447 |
| 2006/0219426 | A1* | 10/2006 | Holmberg | H02G 15/04 |
| | | | | 174/135 |
| 2007/0089894 | A1 | 4/2007 | Holmberg et al. | |
| 2007/0278005 | A1* | 12/2007 | Holmberg | H02G 3/088 |
| | | | | 174/655 |
| 2009/0252472 | A1 | 10/2009 | Solheid et al. | |
| 2010/0054689 | A1 | 3/2010 | Mullaney et al. | |
| 2011/0217017 | A1 | 9/2011 | Drouard et al. | |
| 2011/0255837 | A1* | 10/2011 | Solheid | G02B 6/4447 |
| | | | | 385/135 |
| 2013/0209049 | A1 | 8/2013 | Kowalczyk et al. | |
| 2015/0054229 | A1* | 2/2015 | Haynes | F16L 5/14 |
| | | | | 277/606 |
| 2015/0168663 | A1* | 6/2015 | Aznag | G02B 6/4444 |
| | | | | 385/135 |
| 2016/0147030 | A1* | 5/2016 | Kowalczyk | G02B 6/4441 |
| | | | | 385/135 |
| 2016/0195687 | A1 | 7/2016 | Schurmans et al. | |
| 2017/0003467 | A1 | 1/2017 | Jaksons et al. | |
| 2018/0039037 | A1* | 2/2018 | Aznag | G02B 6/4454 |
| 2018/0074275 | A1* | 3/2018 | Thompson | G02B 6/4452 |
| 2018/0246289 | A1* | 8/2018 | Amaya Cruz | G02B 6/4477 |
| 2019/0377144 | A1* | 12/2019 | Cruz | G02B 6/4471 |
| 2020/0003981 | A1* | 1/2020 | Brown | G02B 6/4444 |
| 2020/0049916 | A1* | 2/2020 | Aznag | G02B 6/4454 |

\* cited by examiner

SYSTEM AND METHOD FOR FEEDING A CABLE INTO AN ENCLOSURE IN A SEALED AND ACCESSIBLE MANNER

CROSS-REFERENCE TO RELATED APPLICATIONS

This application is a continuation-in-part of PCT International Application PCT/US2019/024929, filed Mar. 29, 2019, which claims the benefit of priority of U.S. Provisional Application No. 62/652,669, filed Apr. 4, 2018, the entirety of the disclosures of both of which are incorporated herein by reference.

TECHNICAL FIELD

This disclosure relates to systems and methods related to feeding a cable into an enclosure, and more particularly, to systems and methods for feeding a cable into an enclosure configured to enclose optical communication connections.

BACKGROUND

Cabinets may be used to enclose and protect equipment, such as, for example, fiber optic equipment associated with fiber optic cables including optical fibers. For example, fiber optic equipment may be enclosed in cabinets and provide connections and circuitry for facilitating broadband voice, video, and data transmission. One example of a cabinet for enclosing fiber optic equipment is a fiber optic distribution cabinet, some of which may be intended to be installed in an outdoor environment exposed to the elements. In order to protect cables and equipment inside the cabinet, some such cabinets are constructed to provide a dust- and fluid-resistant barrier between the interior of the cabinet and the surroundings. However, the construction of some cabinets may suffer from a number of possible drawbacks. For example, the exterior of some cabinets is constructed as a single piece, thus rendering such cabinets difficult to repair if damaged and difficult to modify in order to, for example, expand the capacity of the cabinet without replacing large portions of the cabinet, or even the entire cabinet. In addition, the portion of the cabinet at the location at which cables enter the cabinet cannot be removed or replaced without disconnecting the cables from the respective connection points inside the cabinet, which may render its removal or replacement difficult and time consuming.

Some examples described herein may address one or more of these possible drawbacks.

SUMMARY

The present disclosure is generally directed to a method for passing a plurality of optical fibers into an enclosure configured to enclose in an interior thereof a plurality of optical communication connections. The method may include accessing the interior of the enclosure. The interior may be at least partially defined by a floor, opposing side panels, and a roof. The floor may be at least partially defined by an entry module including a module plate and a portion from which the module plate is separable. The method may also include separating the module plate from the portion of the entry module to provide an opening between an exterior of the enclosure and the interior of the enclosure. The method may further include feeding the plurality of optical fibers through the opening and into the interior of the enclosure. The method may also include associating the module plate with the portion of the entry module, such that the module plate and the portion of the entry module at least partially define an aperture through which the plurality of optical fibers pass from the exterior of the enclosure to the interior of the enclosure.

The present disclosure is also generally directed to a system for communicatively coupling a plurality of optical fibers to one another. The system may include an enclosure configured to enclose in an interior thereof a plurality of fiber optic connections. The enclosure may include a floor defining a lower end of the enclosure and including an entry module coupled to the enclosure and configured to facilitate passage of at least one fiber optic cable into the enclosure. The entry module may include a first module plate and a second module plate. At least one of the first module plate or the second module plate may be independently removable from the enclosure to provide an opening between exterior of the enclosure and the interior of the enclosure. The enclosure may also include a support barrier at least partially separating a front portion of the interior of the enclosure from a rear portion of the interior of the enclosure opposite the front portion of the interior. The enclosure may further include a connection panel coupled to the support barrier in the front portion of the interior of the enclosure. The connection panel may be configured to provide optical communication connections between a plurality of optical fibers. The at least one of the first module plate or the second module plate may be located relative to the support barrier, such that the opening provides access from under the enclosure to the rear portion of the interior of the enclosure.

The present disclosure is also generally directed to a method for increasing a capacity of an enclosure configured to enclose in an interior thereof a plurality of fiber optic connections. The method may include accessing the interior of the enclosure. The enclosure may be defined by a floor, opposing side panels, and a roof, and the floor may be at least partially defined by an entry module including a module plate and a portion of the entry module from which the module plate is separable. The method may also include separating the module plate from a lower portion of the enclosure to provide an opening between an exterior of the enclosure and the interior of the enclosure. The method may further include feeding a fiber optic cable including a plurality of optical fibers through the opening and into an interior of the enclosure. The method may also include coupling an end of the fiber optic cable to a connection panel configured to provide optical communication connections between at least some of the plurality of optical fibers of the fiber optic cable and other optical fibers in the interior of the enclosure.

DETAILED DESCRIPTION

Figure 1:
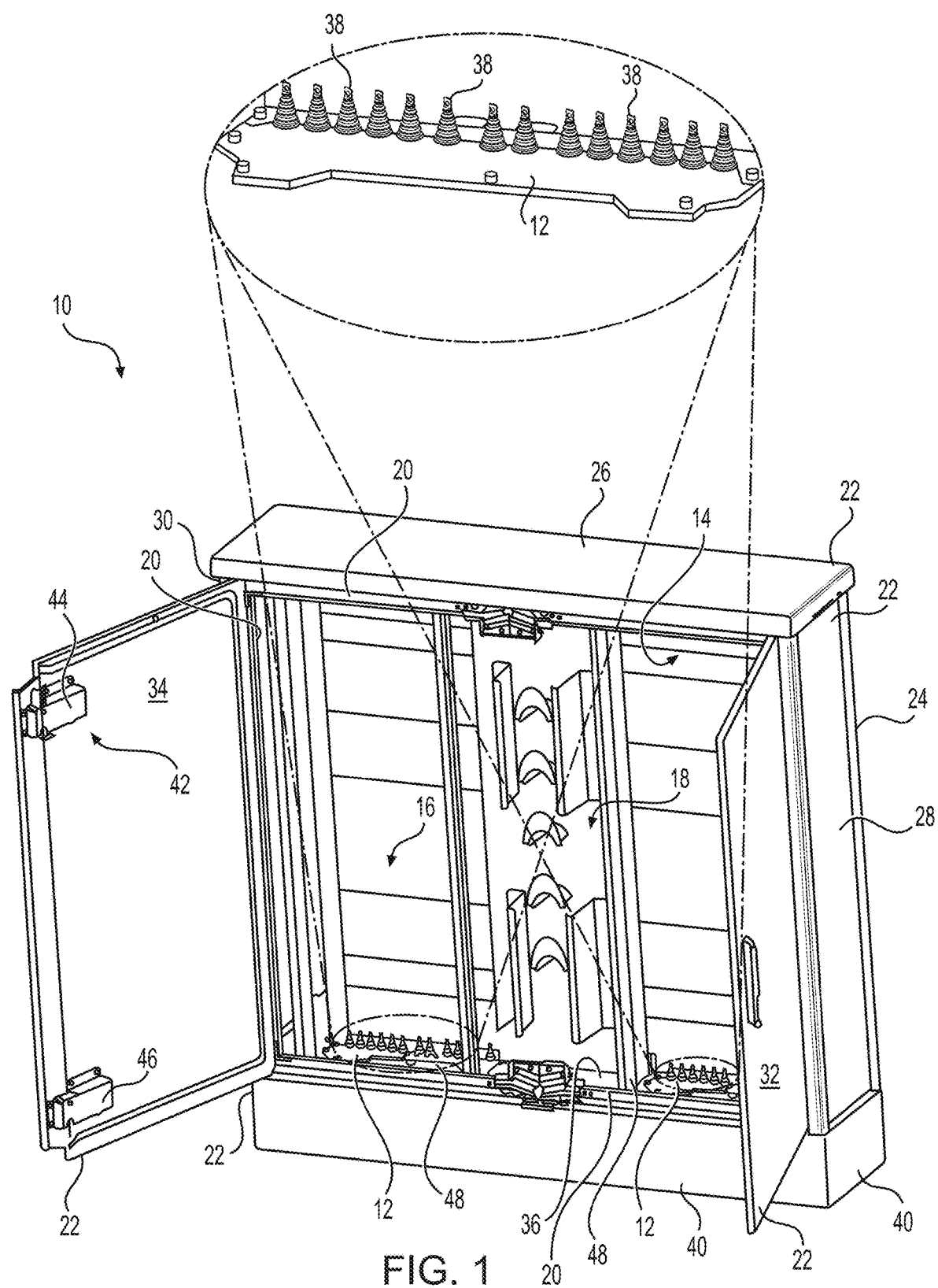
FIG. 1 is a schematic perspective view of an example enclosure including a detailed perspective view of an example entry module for facilitating entry of a plurality of cables into the enclosure.

Reference will now be made in detail to embodiments, examples of which are illustrated in the accompanying drawings. Whenever possible, the same reference numbers are used throughout the drawings to refer to the same or like parts.

This disclosure is generally directed to entry modules for cables, and more particularly, to replaceable entry modules for facilitating entry of cables into an enclosure and related methods. According to some examples, the enclosures described herein may be assembled on site and may be scalable to meet the capacity requirements of the equipment being enclosed by the enclosure. For example, some examples of the enclosure may be formed by a frame assembled from frame members coupled to one another by brackets. The frame members may be provided (or modified on-site) to build a frame (e.g., off-site or on-site) defining the desired interior dimensions, and the brackets may be used to couple the frame members to one another. Thereafter, panels may be attached to the frame to create the enclosure. In some examples, one or more of the panels may be pivotally coupled to the frame to provide one or more doors configured to pivot between open and closed orientations. The enclosure may include an entry module configured to facilitate entry of one or more cables from exterior the enclosure to the interior of the enclosure. In some examples, the entry module may be configured to be at least a part of the floor of the enclosure, and in some examples, the entry module may be part of another portion of the enclosure, such as, for example, at least a part of the back side of the enclosure, at least a part of a side of the enclosure, at least of part of the top of the enclosure, or at least a part of the front side of the enclosure. In some examples, the equipment to be enclosed in the enclosure may be assembled and/or coupled to the interior of the enclosure during and/or after completion of assembly of the enclosure.

In some examples, the entry module may be configured such that at least a portion of the entry module may be repaired or replaced without disconnecting the cables from cable connection points in the interior of the enclosure. For example, access to the entry module may be gained by repositioning or removal of one or more panels of the enclosure. In some examples, access to the entry module may be gained by opening one of more of the door panels. In some examples, access to the entry module may be gained by removing one or more back panels of the enclosure. Once access to the entry module has been gained, one or more portions of the entry module may be repositioned, repaired, and/or removed. For example, the entry module may include two or more selectively separable module plates that form one or more apertures through which one or more cables enter the enclosure. In some examples, because the module plate being removed includes a portion of an aperture that does not completely surround one or more of the cables, the module plate may be removed without necessarily disconnecting the one or more cables from their respective connection points. In some examples, two or more module plates define one or more of the apertures through which the one or more cables pass, and thus, either or both of such module plates may be removed without disconnecting the one or more cables from the respective connection points of the cables in the interior of the enclosure. This example configuration may render repair and/or replacement of one or more portions of the entry module much easier and less time consuming. Further, such repairs and/or replacements may be accomplished without disruption of service.

FIG. 1 is a schematic perspective view of an example enclosure 10 including a detailed perspective view of an example entry module 12. The example enclosure 10 shown in FIG. 1 is a cabinet for enclosing fiber optic equipment, such as fiber optic cables including optical fibers, and connections and circuitry for facilitating broadband voice, video, and data transmission. In some examples, the enclosure 10 may be a fiber optic distribution outdoor cabinet, which may be intended to be installed in an outdoor environment exposed to the elements. Other types of enclosures for enclosing other types of equipment are contemplated.

As shown in FIG. 1, the example enclosure 10 defines an interior 14 and an exterior 16. In the example shown, the interior 14 includes various structures 18 known to those skilled in the art for facilitating routing and/or connection of fiber optic cables including optical fibers. The example enclosure 10 shown includes a frame 20 and a plurality of exterior panels 22 secured to the frame 20 for enclosing the interior 14 of the enclosure 10. For example, the enclosure 10 includes a back panel 24 coupled to a back side of the frame 20, a top panel 26 coupled to a top side of the frame 20, a first side panel 28 coupled to a first side of the frame 20, a second side panel 30 coupled to a second side of the frame 20 opposite the first side panel 28, a first door panel 32 coupled to a front side of the frame 20 such that it pivots with respect to the frame 20, and a second door panel 34 coupled to a front side of the frame 20 such that it pivots with respect to the frame 20. In some examples, the enclosure 10 also includes a bottom panel 36 coupled to a bottom side of the frame 20.

In some examples, the bottom panel 36 may include an opening configured to receive therein the entry module 12. In some examples, the entry module 12 may form the majority (or entirety) of the bottom panel 36. As explained herein, the entry module 12 facilitates entry of cables, such as, for example, fiber optic cables, into the interior 14 of the enclosure 10. In some examples, one or more seals 38 may be provided to provide a substantially fluid-resistant seal (e.g., a fluid-tight seal) between each of the one or more cables and the entry module 12, for example, as explained in more detail herein. In some examples, the seals 38 may include one or more of natural rubber, synthetic rubber, and plastics, and/or any other suitable materials (e.g., suitable elastic materials or gasket-like materials) for providing a fluid-resistant seal.

The example enclosure 10 shown in FIG. 1 also includes a skirt 40 coupled to and extending around the periphery of the bottom of the frame 20, which provides protection for cables entering the interior 14 of the enclosure 10 through the bottom panel 36. One or more of the first door panel 32 or the second door panel 34 may include a latch assembly 42 for securing the first and second door panels 32 and 34 in the closed orientation. In the example shown, the latch assembly 42 includes an upper latch mechanism 44 and a lower latch mechanism 46, each including a keeper configured to selectively engage a respective upper member of the frame 20 and lower member of the frame 20. Although FIG. 1 shows the latch assembly 42 coupled to an interior side of the second door panel 34, in some examples, a second latch mechanism may be coupled to the interior side of the first door panel 32.

Figure 2:
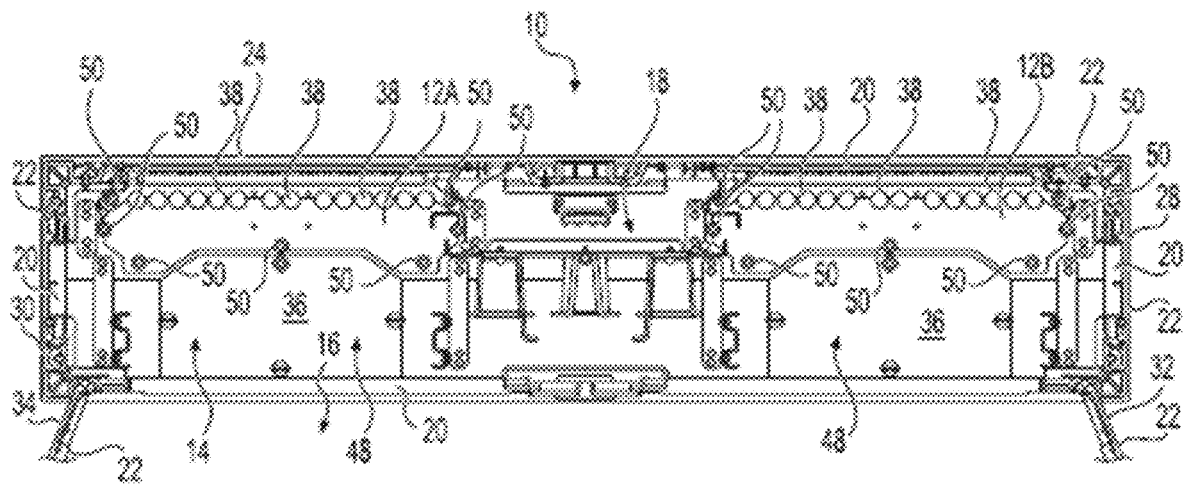
FIG. 2 is a schematic plan cutaway view showing the interior of the example enclosure shown in FIG. 1 from above.

FIG. 2 is a schematic plan cutaway view showing the interior 14 of the example enclosure 10 shown in FIG. 1 from above with the top panel 26 and at least some contents of the enclosure 10 removed to view the example bottom panel 36 and the example entry module 12. In the example shown, the bottom panel 36 forms a majority of the floor 48 of the enclosure 10. In some examples, the bottom panel 36 may be a single piece unitary construction, and in other examples, the bottom panel 36 may be formed from two or more panels coupled to one another to form the majority of the floor 48. The example shown in FIG. 2 includes two entry modules 12A and 12B. Some examples may only include a single entry module 12, and other examples may include more than two entry modules 12. In the example shown, each of the entry modules 12A and 12B is removably coupled to the bottom panel 36 by fasteners 50, such as, for example, screws and/or nuts and bolts. Other ways of removably coupling the entry modules 12A and 12B to the bottom panel 36 are contemplated. In some examples, a seal or gasket (not shown) may be provided between the perimeter of one or more of the entry modules 12A or 12B and the bottom panel 36 to provide a substantially fluid-resistant seal (e.g., a fluid-tight seal) between one or more of the entry modules 12A or 12B and the bottom panel 36.

Figure 3:
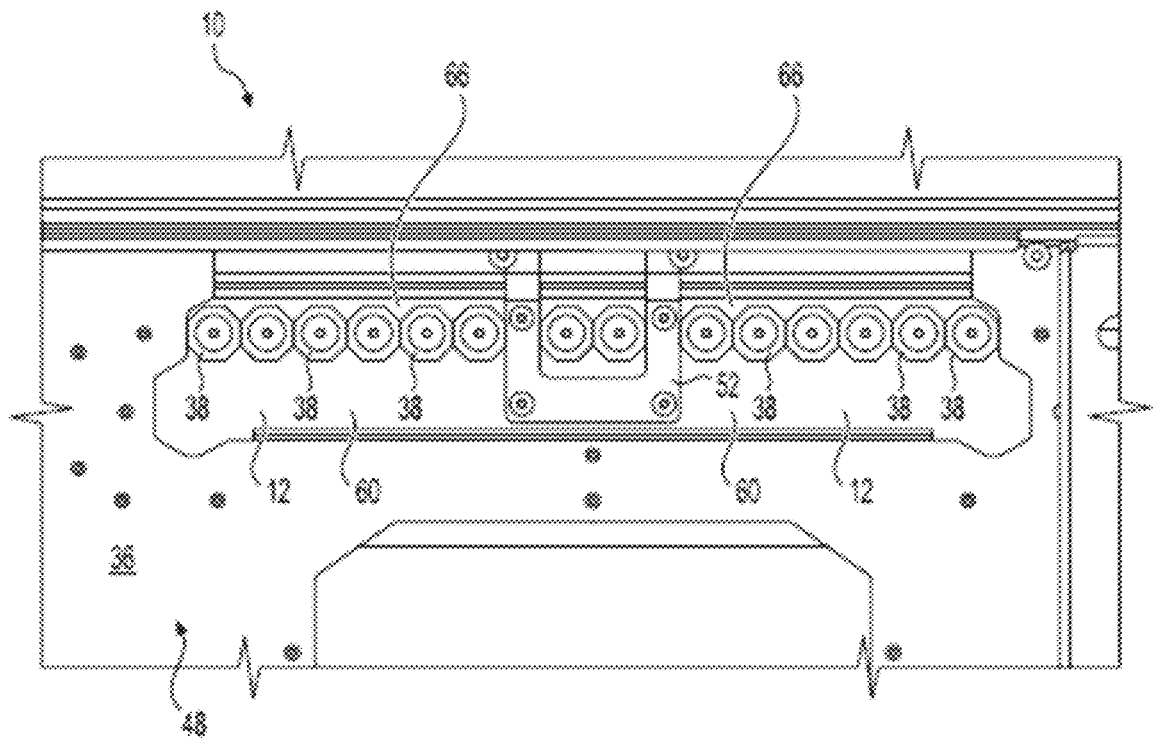
FIG. 3 is a partial schematic plan view of the example enclosure shown in FIG. 1 showing an example entry module from below.

FIG. 3 is a partial schematic plan view of the example enclosure 10 shown in FIG. 1 showing the example entry module 12 from below. FIG. 3 shows the underside of one of the example entry modules 12A show in FIG. 2. As shown in FIG. 3, the example entry module 12 is coupled to the portion of the enclosure 10 by an example attachment bracket 52, which may be coupled to either or both the entry module 12 and the interior 14 of the enclosure 10. In some examples, a plurality of the seals 38 may be provided to provide a fluid-resistant seal (e.g., a fluid-tight seal) between each cable that enters the enclosure 10 and the entry module 12, for example, as explained in more detail herein. The example shown in FIG. 3 includes fourteen seals 38 for receiving fourteen cables. Fewer or more seals 38 and cables are contemplated.

Figure 4:
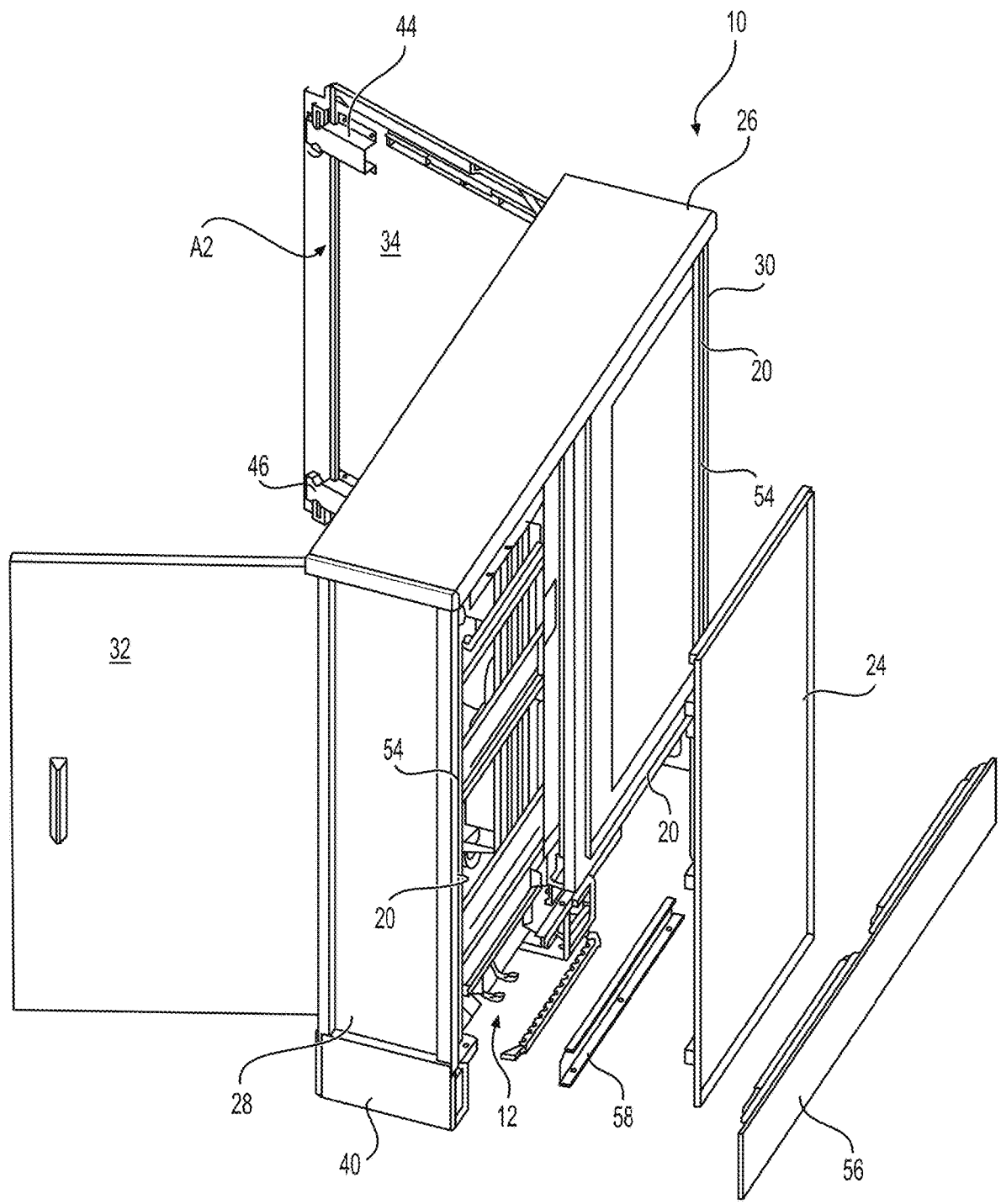
FIG. 4 is schematic perspective exploded view of the example enclosure shown in FIG. 1.
Figure 5:
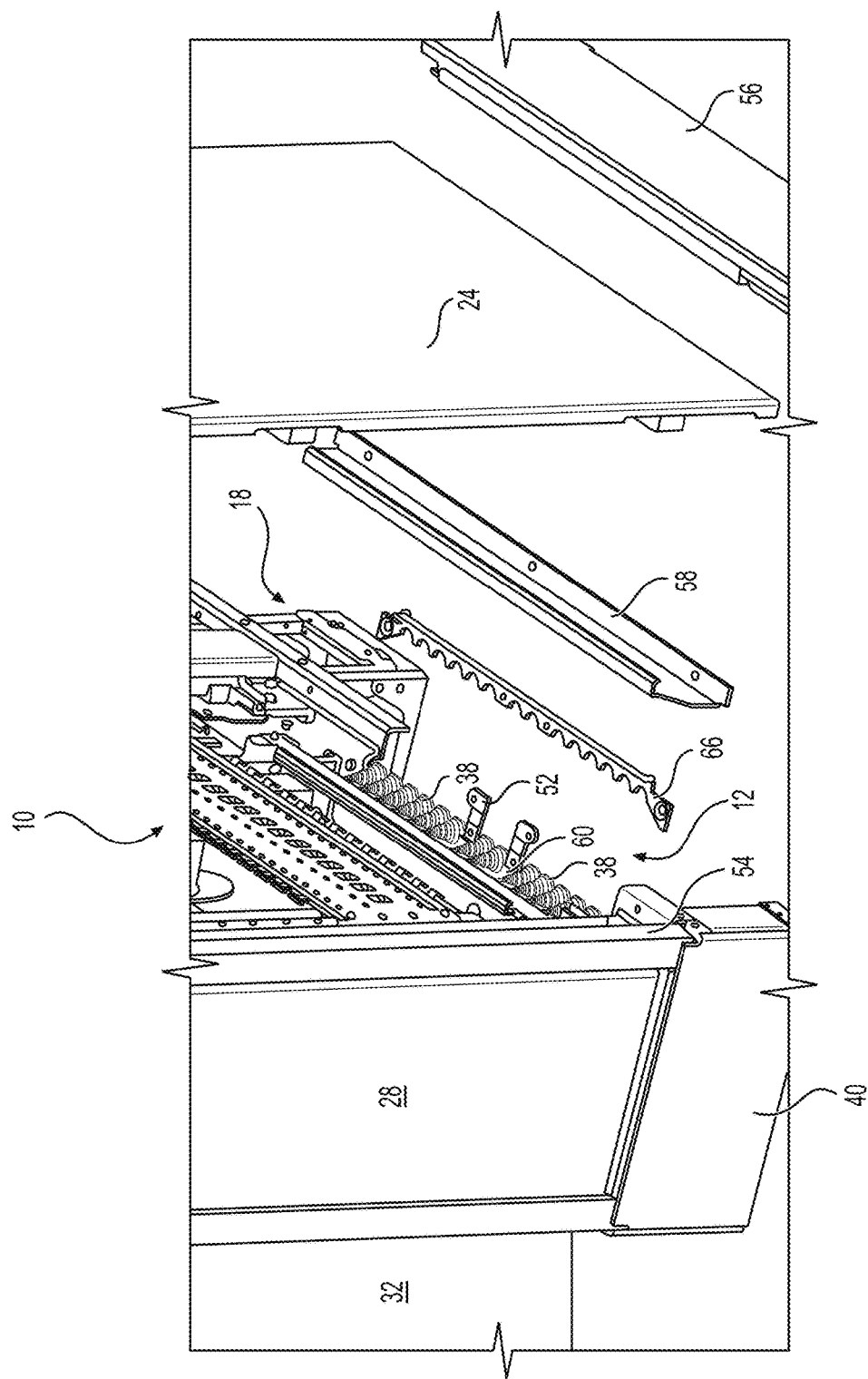
FIG. 5 is a schematic detailed view of the example enclosure shown in FIG. 4.

FIGS. 4 and 5 are schematic perspective exploded views of the example enclosure 10 shown in FIG. 1, with the back panel 24 and a portion of the skirt 40 removed, for example, to show access to the example entry module 12. As shown in FIGS. 4 and 5, the back panel 24 may be removed, for example, by separating it from a back side 54 of the frame 20. For example, the back panel 24 may be removably coupled to the frame 20 by one or more fasteners, and the one or more fasteners may be removed to facilitate removal of the back panel 24 from the back side 54 of the frame 20. In some examples, a back side 56 of the skirt 40 and/or a lower back side frame member 58 may also be removed, for example, to provide access to the entry module 12. In some examples, the attachment bracket 52 may be removably coupled to the lower back side frame member 58 and/or the bottom panel 36, for example, via one or more fasteners.

Figure 6:
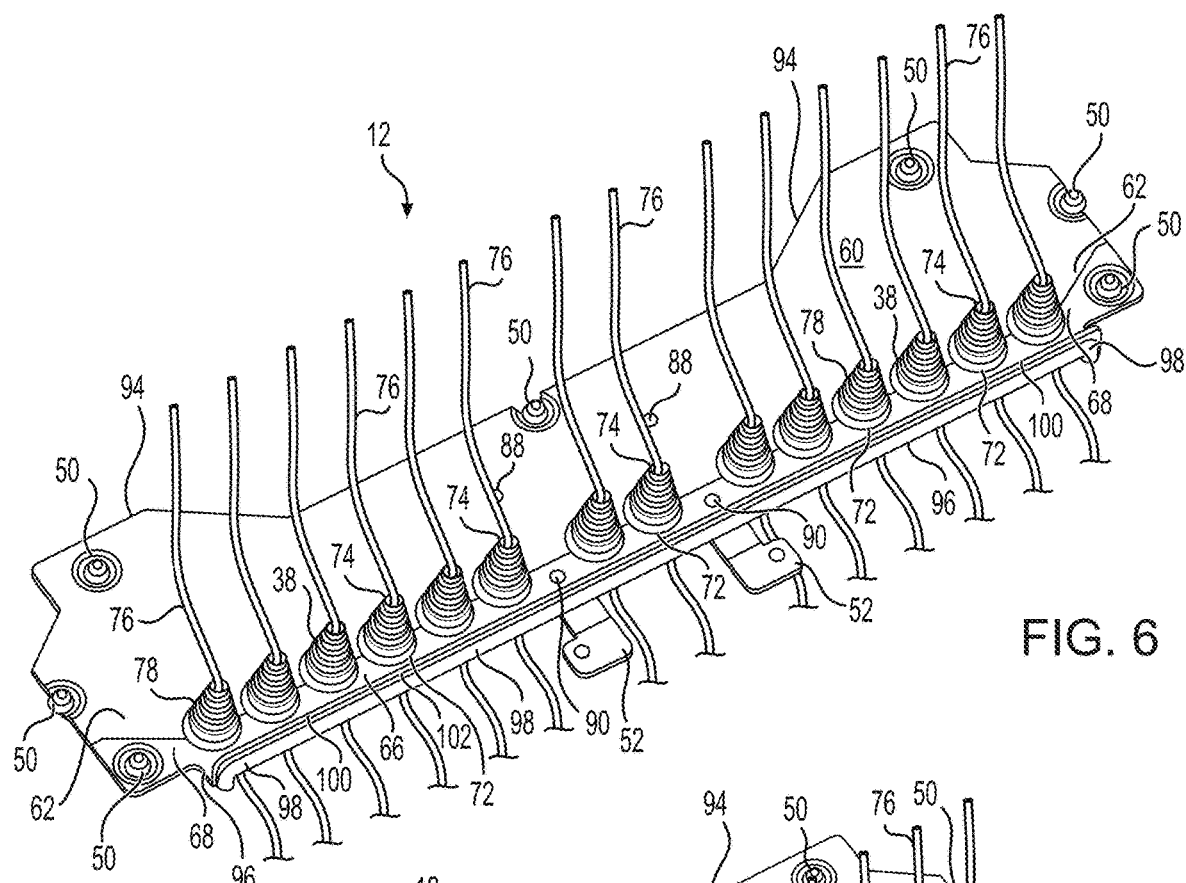
FIG. 6 is a schematic perspective view of an example entry module.
Figure 7:
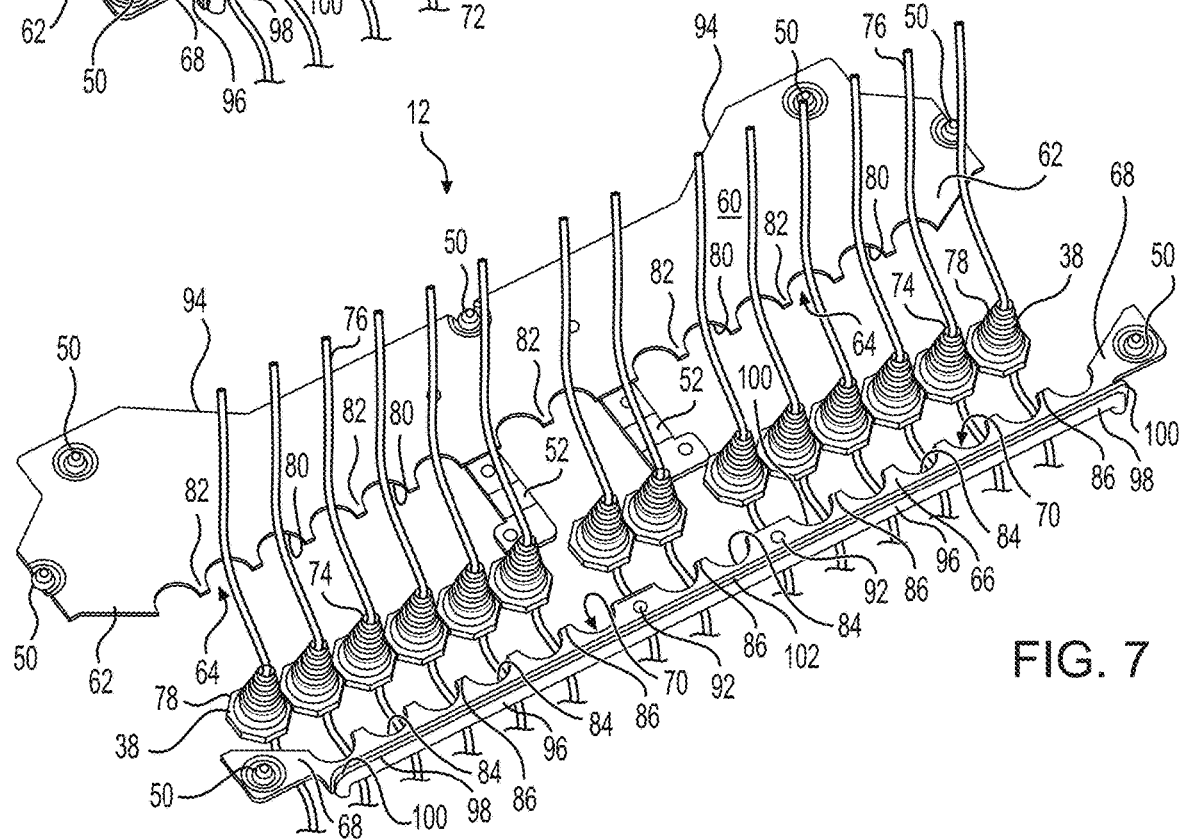
FIG. 7 is a schematic exploded perspective view of the example entry module shown in FIG. 6.

FIGS. 6 and 7 are a schematic perspective view of an example entry module 12 and an exploded perspective view of the example entry module 12 shown in FIG. 6. In the example shown in FIGS. 6 and 7, the entry module 12 includes a first module plate 60 including a first edge 62 defining a first edge profile 64. The example entry module 12 also includes a second module plate 66 including a second edge 68 defining a second edge profile 70. In some examples, such as the example shown, the first module plate 60 and the second module plate 66 are configured to approach (e.g., abut) one another (see FIG. 6), such that the first edge profile 64 and the second edge profile 70 define one or more apertures 72 therebetween (see FIG. 7). In some examples, the first module plate 60 and the second module plate 66 are configured to approach one another, such that they are separated by a marrow gap that may be, in some examples, sealed, for example, with a seal-like structure and/or using a caulk-like material. Features described herein as being associated with the first module plate 60 may instead be associated with the second module plate 66, and features described herein as being associated with the second module plate 66 may instead be associated with the first module plate 60.

In the examples shown in FIGS. 6 and 7, a plurality of the seals 38 may be coupled to the entry module 12, and each of the seals 38 may define an interior passage 74 through which a respective cable 76 may pass. As explained above, the seals 38 may be configured to provide a fluid-resistant seal (e.g., a fluid-tight seal) between an outer surface of a respective cable 76 and an interior surface defined by the interior passage 74 of a respective seal 38, and a fluid-resistant-seal (e.g., a fluid-tight seal) between an exterior surface 78 of the respective seal 38 and an interior surface of the respective aperture 72 of the entry module 12. For example, a respective cable 76 may pass through an interior passage 74 from exterior 16 relative to the enclosure 10 to the interior 14 of the enclosure 10. In some examples, the seals 38 may be coupled to the first and second module plates 60 and 66 by coupling the first and second module plates 60 and 66 to one another, such that the seals 38 are received in the apertures 72. For example, the exterior surface 78 of the seal 38 may be configured to secure the seal 38 to an edge of a respective aperture 72, for example, such that a fluid-resistant seal (e.g., a fluid-tight seal) is provided.

In the example shown in FIGS. 6 and 7, the first edge profile 64 defines first aperture portions 80 and first edge segments 82 between at least some of the first aperture portions 80. The example second edge profile 70 defines second aperture portions 84 and second edge segments 86 between at least some of the second aperture portions 84. In some examples, the first module plate 60 and the second module plate 66 are configured to approach (e.g., abut) one another, such that at least some of the first edge segments 82 approach (e.g., abut) at least some of the second edge segments 86, and at least some of the first aperture portions 80 and at least some of the second aperture portions 84 define the plurality of apertures 72. In the example shown, the example apertures 72 defined by the first and second apertures portions 80 and 84 are substantially circular. In some examples, one or more of the apertures 72 may have a shape other than substantially circular. For example, one or more of the apertures 72 may be polygonal in shape (e.g., square-shaped, pentagonal-shaped, hexagonal-shaped, octagonal-shaped, etc.). In the example shown in FIGS. 6 and 7, each of the first and second aperture portions 80 and 84 are substantially identical. In some examples, the first and second aperture portions 80 and 84 may be different. In some examples, either the first aperture portions 80 or the second aperture portions 84 may be substantially a continuation of the respective first edge segments 82 or the second edge segments 86, for example, such that the first edge profile 64 or the second edge profile 70 is substantially colinear.

In the example shown in FIGS. 6 and 7, the first edge segments 82 and the second edge segments 86 are substantially straight segments. In some examples, the first and second edge segments 82 and 86 may define complimentary but non-straight segments, such as, for example, interfitting square waves, interfitting sinusoidal waves, interfitting saw tooth profiles, etc. Such examples may serve to register the first module plate 60 with the second module plate 66, for example, such that the first and second aperture portions 80 and 84 are aligned with one another. In some examples, one or more of the first edge segments 82 and one or more of the second edge segments 86 may define edge segments having different shapes.

In the example shown in FIGS. 6 and 7, the first module plate 60 lies substantially in a first plane, and the second module plate 66 lies substantially in a second plane. Although lying in respective planes, one or more of the first module plate 60 or the second module plate 66 may also include non-planar aspects. In some examples, the first module plate 60 and the second module plate 66 are configured to approach (e.g., abut) one another, such that the first plane and the second plane are substantially coplanar and/or substantially parallel with respect to one another.

In some examples, the attachment bracket 52 may be coupled (e.g., removably) to one or more of the first module plate 60 or the second module plate 66. In some examples, the attachment bracket 52 may be configured to removably couple the entry module 12 to the enclosure 10. For example, the attachment bracket 52 may be configured to removably couple the entry module 12 to the interior 14 and/or exterior 16 of the enclosure 10, for example, to the frame 20 (e.g., to the lower back side frame member 58) and/or to the bottom panel 36. In the example shown in FIGS. 6 and 7, the attachment bracket 52 is removably coupled to the first module plate 60 (e.g., via one or more fasteners 88) (FIG. 7), and is removably coupled to the second module plate 66 (e.g., via one or more fasteners 90). For example, the example second module plate 66 shown in FIGS. 6 and 7 includes holes 92 configured to receive the example fasteners 90. In the example shown, the attachment bracket 52 serves to removably couple the first and second module plates 60 and 66 to one another. In some examples, the attachment bracket 52 may include two or more parts.

As shown in FIGS. 6 and 7, in some examples, the first module plate 60 defines a first remote edge 94 opposite the first edge 62, and the second module plate 66 defines a second remote edge 96 opposite the second edge 68, and the entry module 12 may also include at least one edge seal 98 coupled to one or more of the first remote edge 94 or the second remote edge 96. For example, as shown in FIGS. 6 and 7, the second remote edge 96 defines an edge flange 100, and the edge seal 98 is coupled to an outboard side 102 of the edge flange 100. The edge seal 98, in some examples, may provide a fluid-resistant seal (e.g., a fluid-tight seal) between the entry module 12 (e.g., the second module plate 66) and the interior 14 of the enclosure 10. In some examples, the edge seal 98 may be adhesively secured to the edge flange 100. (Even though the example second module plate 66 includes the example edge flange 100, the second module plate 66 lies substantially in a plane.)

Figure 8:
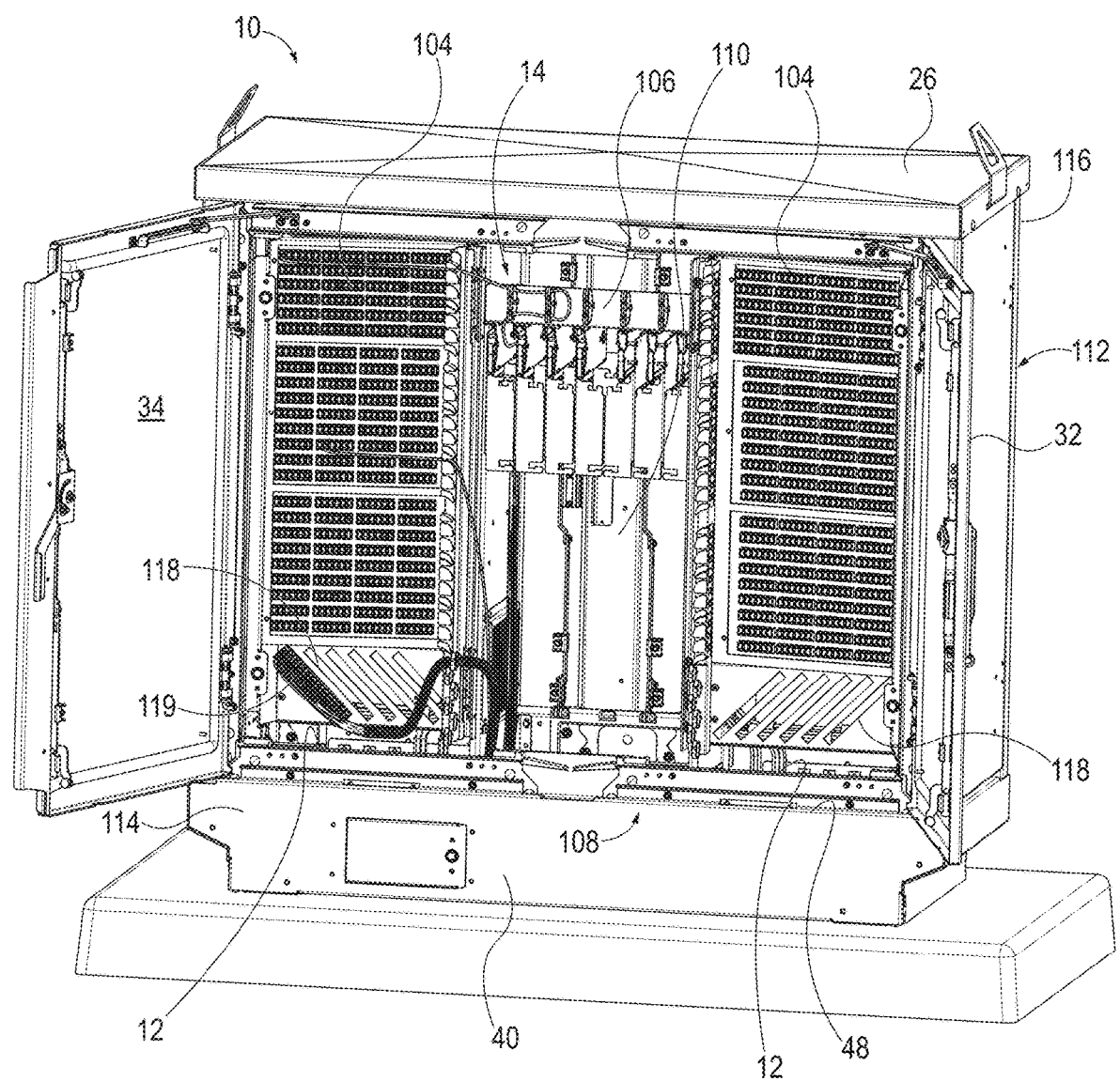
FIG. 8 is a schematic perspective front view of an example enclosure including two example connection panels and an example splitter module holder.

FIG. 8 is a schematic perspective front view of an example enclosure 10. The example enclosure 10 shown in FIG. 8 may provide a system for communicatively coupling a plurality of optical fibers to one another. In the example shown, the enclosure 10 includes two example connection panels 104 (e.g., distribution panels) and an example splitter module holder 106 in a front portion 108 of the interior 14 of the example enclosure 10. For example, the enclosure 10 shown in FIG. 8 includes a support barrier 110 at least partially separating the front portion 108 of the interior 14 of the enclosure 10 from a rear portion 112 (see, e.g., FIGS. 9, 10, and 15) of the interior 14 of the enclosure 10 opposite the front portion 108 of the interior 14. In some examples, the support barrier 110 may be coupled to the enclosure 10 such that a volume of the front portion 108 of the interior 14 of the enclosure 10 and a volume of the rear portion 112 of the interior 14 of the enclosure 10 may be substantially the same. For example, the support barrier 110 may be coupled to the enclosure 10 at a position of the interior side of the top panel 26 and/or the interior of the floor 48, such that the support barrier 110 is substantially equidistant from a front 114 of the enclosure 10 and a rear 116 of the enclosure 10.

In some examples, the splitter module holder 106 may be configured to at least partially support and/or contain a plurality of splitter modules configured to provide communicative coupling between a single optical fiber on an input side and a plurality of optical fibers on an output side (e.g., thirty-two optical fibers on the output side, although other numbers of optical fibers on the output side are contemplated). For example, the optical fibers on the input side may include optical fibers of one or more fiber optic cables 76 (see, e.g., FIGS. 6 and 7) that enter the enclosure 10 via, for example, a lower portion of the enclosure 10. In some examples, such fiber optic cables 76 may be in communication with a communication service provider, such as, for example, a provider of telecommunications services. The splitter modules may be configured to multiply signals from the service providers into a plurality of communication signals via the plurality of optical fibers on the output side of the splitter modules.

In some examples, one or more of the example connection panels 104 may be configured to provide communication connections between a plurality of optical fibers from the splitter modules and other communication lines. For example, optical fibers from one or more splitter modules may be routed to the one or more connection panels 104 and coupled thereto, such that optical fibers exiting the enclosure 10 may be communicatively coupled thereto via the connection panels 104. The optical fibers exiting the enclosure 10 may be routed to various end user locations, such as, for example, various locations within a building and/or to different buildings in a neighborhood. In some examples, one or more of the connection panels 104 may be configured to provide, for example, 432 communication connections, although other connection capacities are contemplated.

In some examples, one or more of the connection panels 104 may be mounted in the front portion 108 of the enclosure 10, for example, such that they pivot relative to the support barrier 110 to provide access to a rear side of the respective connection panels 104, which may facilitate installation and/or servicing by a technician (e.g., to facilitate connection of optical fibers to a rear side of the connection panels 104). In the example shown in FIG. 8, the front portion 108 of the enclosure 10 includes two connection panels 104, although other numbers of connection panels 104 are contemplated. As shown in FIG. 8, some examples of the enclosure 10 may include one or more holding receptacles 118 configured to retain a connection block 119 coupled to a plurality of optical fibers, for example, of the output side of the splitter modules. The holding receptacles 118 may facilitate temporary management of optical fibers until such optical fibers are ready to be communicatively coupled to the one or more connection panels 104.

In some examples, the enclosure 10 may provide a floor 48 at least partially defining a lower end of the enclosure 10 and including one or more entry modules 12 coupled to the enclosure 10 and configured to facilitate passage of at least one fiber optic cable into the enclosure, for example, as described previously herein with respect to FIGS. 1-7. For example, the entry module 12 may include a first module plate 60 and a second module plate 66 (see, e.g., FIGS. 3 and 5-7), and at least one of the first module plate 60 or the second module plate 66 may be independently removable from the enclosure 10 to provide an opening between the exterior 16 of the enclosure 10 and the interior 14 of the enclosure 10.

Figure 9:
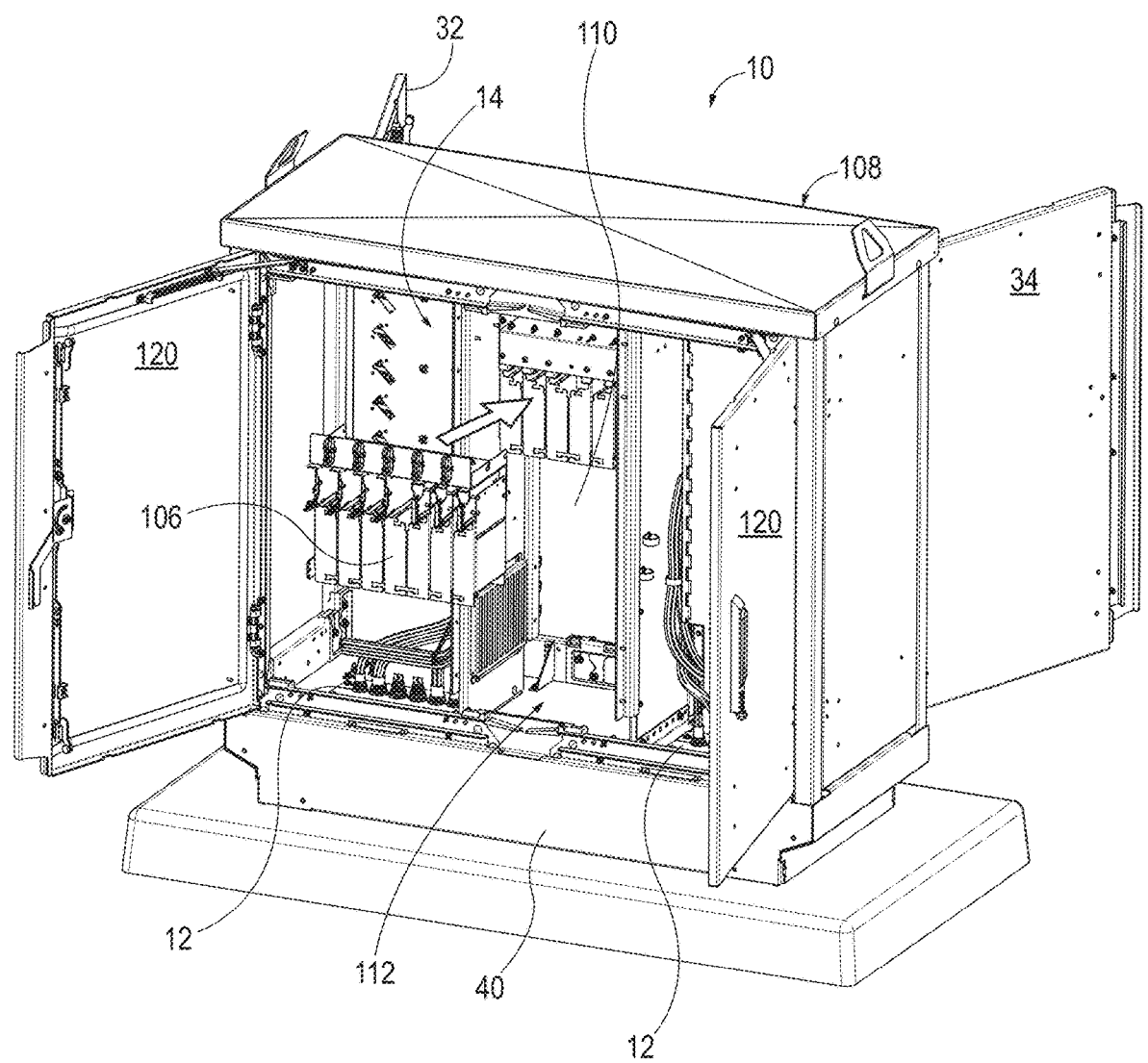
FIG. 9 is a schematic perspective rear view of the example enclosure shown in FIG. 8 showing example insertion of an example splitter module holder into a rear portion of the interior of the enclosure.

For example, FIG. 9 is a schematic perspective rear view of the example enclosure 10 shown in FIG. 8. As shown in FIG. 9, the example enclosure 10 includes a rear portion 112 of the interior 14 at least partially defined by the support barrier 110. The example enclosure shown includes a floor 48 at least partially defining a lower end of the enclosure 10 and including two example entry modules 12 coupled to the enclosure 10 and configured to facilitate passage of at least one fiber optic cable into the enclosure 10. In some examples, the enclosure 10 may be configured to facilitate increasing a capacity of the enclosure 10, such that the enclosure 10 is able to support communicatively coupling an increased number of optical fibers relative to the capacity provided by the front portion 108 of the enclosure 10. For example, the enclosure 10 may be assembled to provide communicative coupling of optical fibers, at least initially, only in the front portion 108 of the interior 14 of the enclosure 10, for example, on one side of the support barrier 110, for example, as shown in FIG. 8. At a later time, it may be desirable to increase the communicative coupling capacity of the enclosure 10, for example, to accommodate increasing demand of telecommunications services desired by additional recipients of the services. As shown in FIG. 9, the enclosure 10 may include one or more rear doors 120 configured to pivot between a closed position and an open position, thereby providing access to the rear portion 112 of the enclosure 10. Additionally or alturnativly, the enclosure 10 may include one or more panels that may be removed to enable access to the rear portion 112 of the enclosure 10, such as the example embodiment depicted in FIG. 4. As shown in FIG. 9, the support barrier 110 provides a support structure configured to facilitate connection of additional splitter module holders 106 and/or connection panels within the rear portion 112 of the interior 14 of the enclosure 10 to increase the connection capacity of the enclosure 10. FIG. 9 shows an example insertion of an example splitter module holder 106 into the rear portion 112 of the interior 14 of the enclosure 10, for example, as identified by the arrow.

Figure 10:
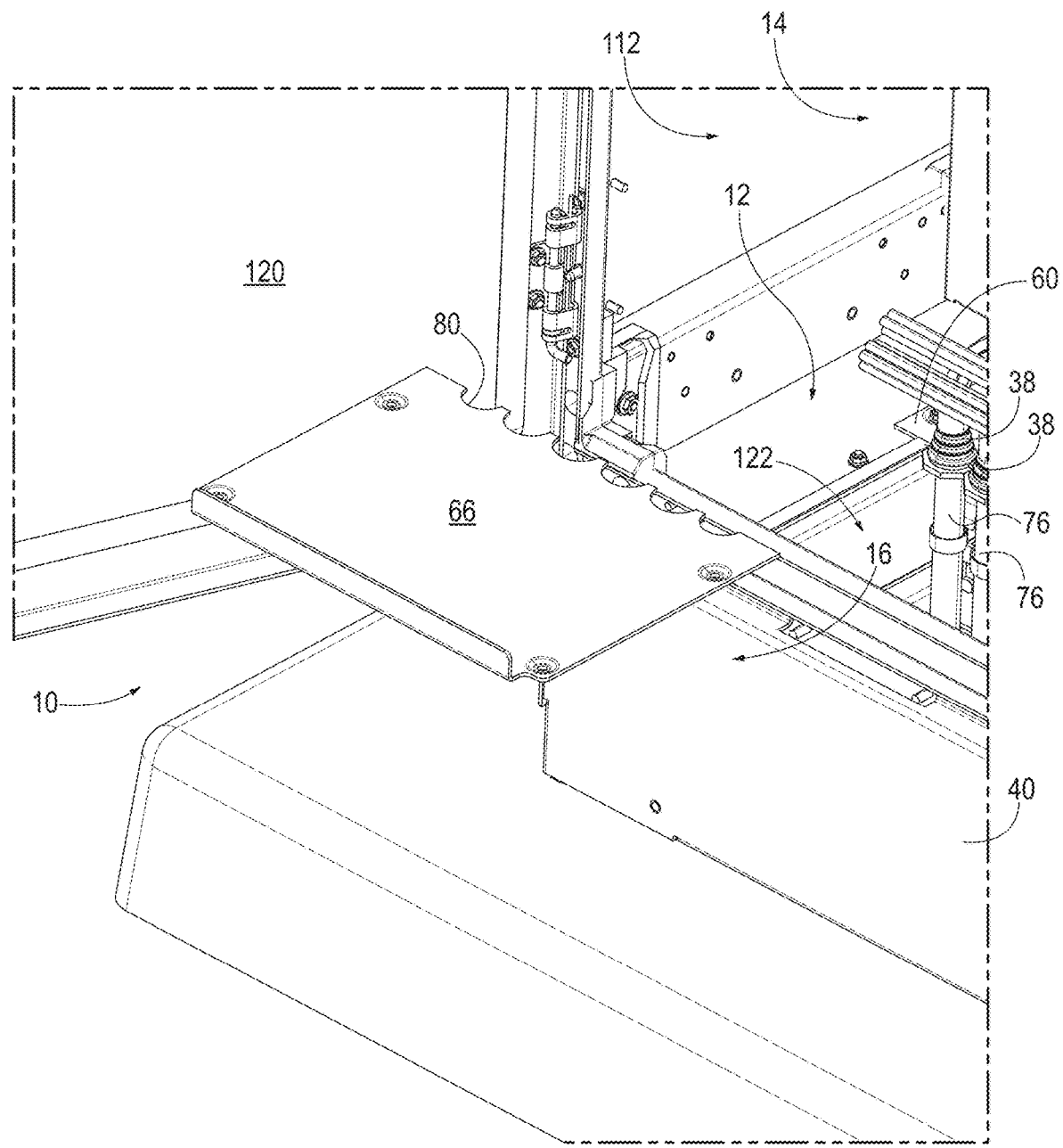
FIG. 10 is a close-up schematic perspective rear view of the example enclosure shown in FIGS. 8 and 9 showing example separation of an example module plate from a lower portion of the rear of the enclosure to create an example opening in the lower portion of the enclosure.

FIG. 10 is a schematic partial perspective rear view of the example enclosure 10 shown in FIGS. 8 and 9. As shown in FIG. 10, the enclosure 10 includes an entry module 12 including a first module plate 60 and a second module plate 66 (see, e.g., FIGS. 3 and 5-7). In some examples, at least one of the first module plate 60 or the second module plate 66 may be independently removable from the enclosure 10 to provide an opening 122 between the exterior 16 of the enclosure 10 and the interior 14 of the enclosure 10. In some examples, the first module plate 60 and/or the second module plate 66 may be coupled to the enclosure 10 via one or more fasteners 50 (e.g., removable fasteners such as screws, bolts, and/or nuts (see, e.g., FIGS. 2, 6, and 7)). For example, as shown in FIG. 10, the second module plate 66 has been separated from the first module plate 60 and the interior 14 of the enclosure 10, thereby creating the opening 122 through which one or more fiber optic cables 76 may be fed from exterior 16 the enclosure 10 to the interior 14 of the enclosure 10, for example, such that the opening 122 provides access from under the enclosure 10 to the rear portion 112 (and/or the front portion 108) of the interior 14 of the enclosure 10. As shown, the example second module plate 66 includes aperture portions 80 configured to cooperate with corresponding aperture portions of the first module plate 60 (see, e.g., FIGS. 6 and 7) to provide clearances for entry of one of more fiber optic cables 76 into the interior 14 of the enclosure 10, and in some examples, to provide clearances for receipt and engagement of one or more respective seals 38 (see, e.g., FIGS. 6 and 7) for providing a fluid-resistant and/or dust-resistant seal between the respective fiber optic cables 76 and the first module plate 60 and the second module plate 66.

Figure 11:
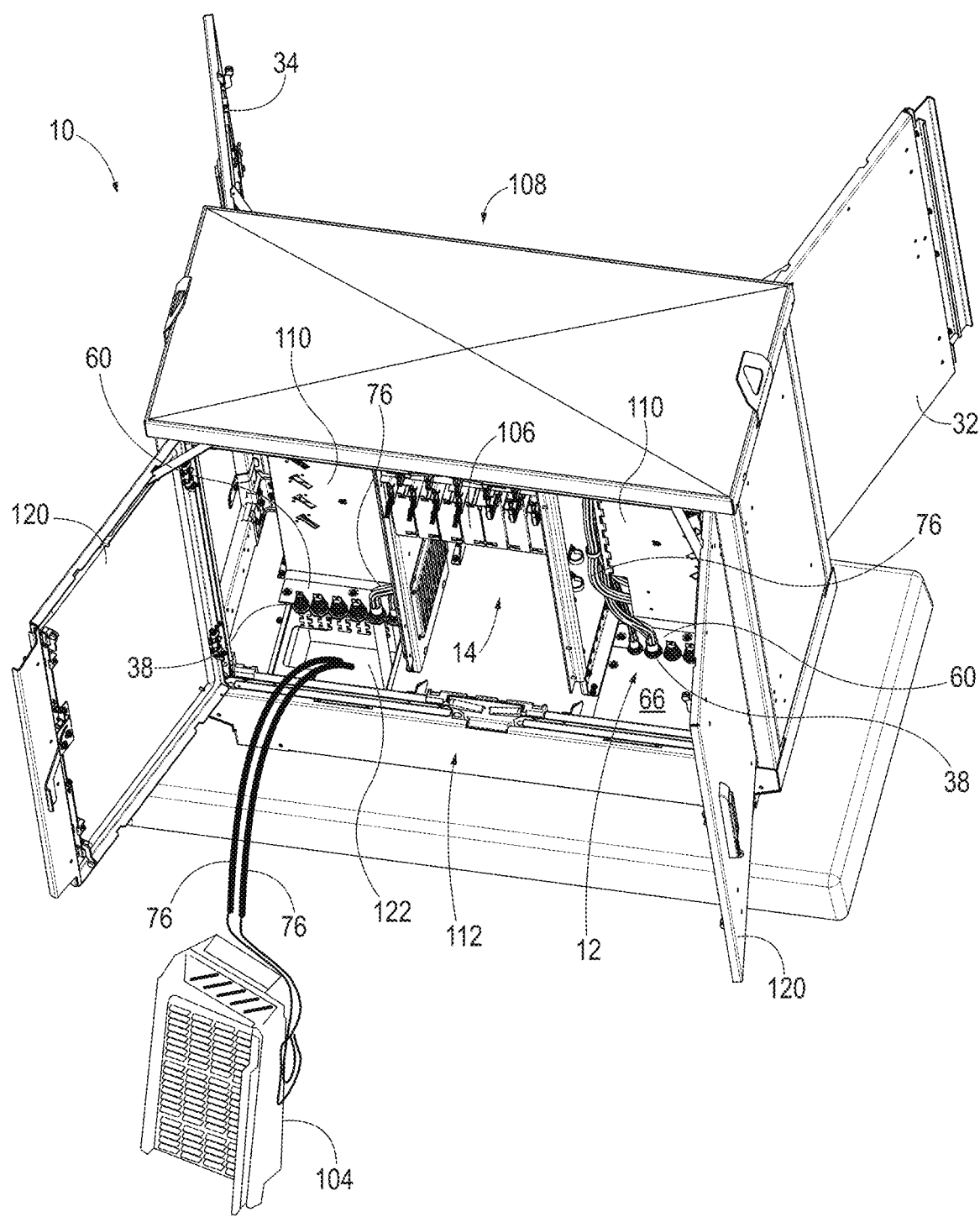
FIG. 11 is a schematic perspective rear view of the example enclosure shown in FIGS. 8 and 9 showing example feeding of example cables including optical fibers through the example opening shown in FIG. 10 and into the rear portion of the interior of the enclosure with example coupling of the cables to an example connection panel.

FIG. 11 is a schematic perspective rear view of the example enclosure 10 shown in FIGS. 8 and 9 showing example feeding of example fiber optic cables 76, for example, including optical fibers, through the example opening 122 shown in FIG. 10 and into the rear portion 112 of the interior 14 of the enclosure 10. As shown in FIG. 11, one or more of the fiber optic cables 76 may be communicatively coupled to an example connection panel 104, which in turn, may be coupled to the rear portion 112 of the example enclosure 10. In some examples, for example, as shown in FIG. 11, the rear portion 112 of the enclosure 10 may include a second entry module 12, for example, at an opposite end of the enclosure 10 (e.g., the end on the right side of the rear portion 112 of the enclosure 10, as depicted), to facilitate feeding one or more additional fiber optic cables 76 into the rear portion 112 (and/or the front portion 108) of the interior 14 of the enclosure 10. In addition, the one or more additional fiber optic cables 76 may be communicatively coupled to one or more connection panels 104, for example, in a manner similar to the two connection panels 104 in the front portion 108 of the interior 14 of the enclosure 10, as shown in FIG. 8.

Figure 12:
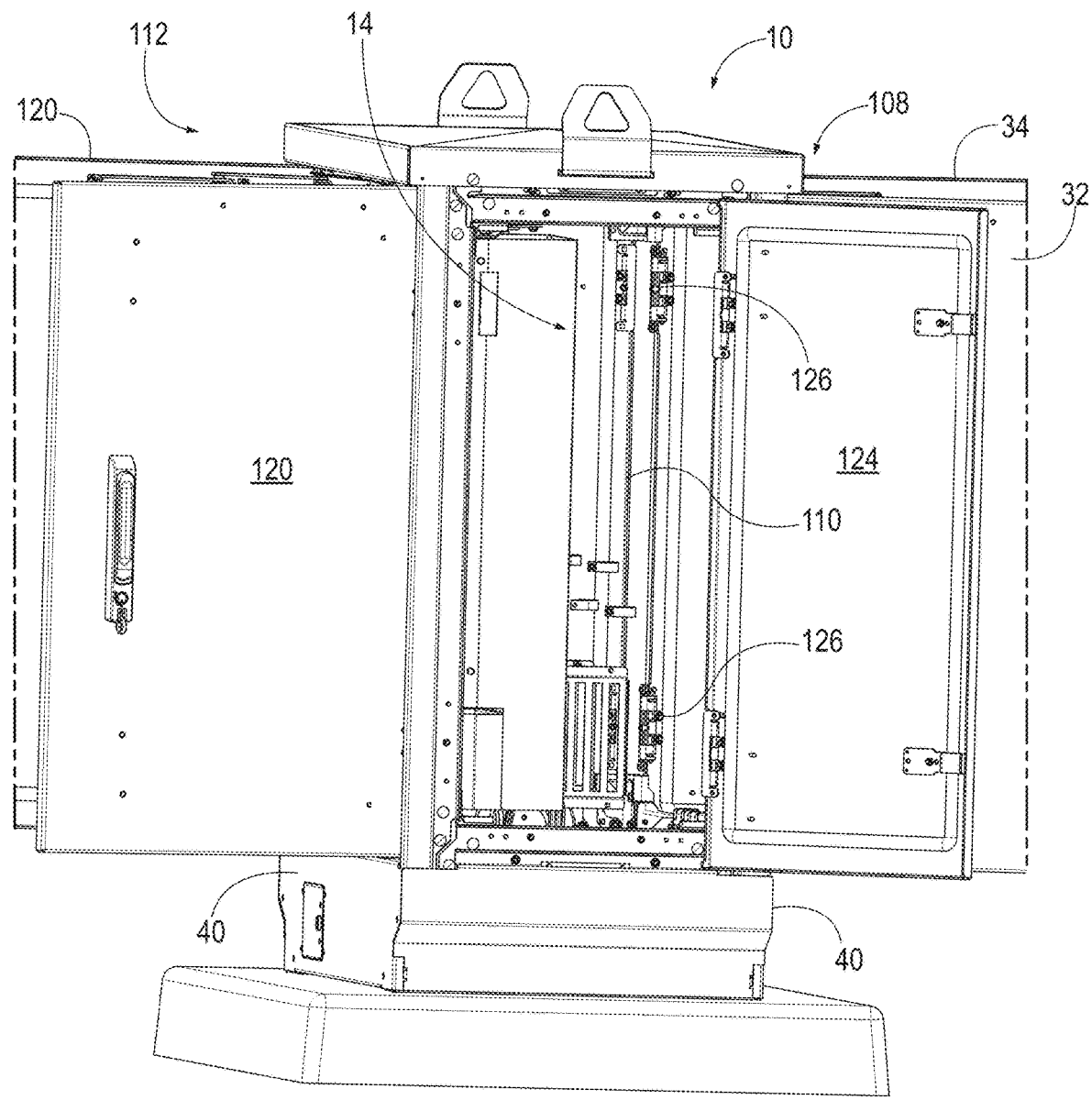
FIG. 12 is a schematic perspective end view through an example end door of the example enclosure shown in FIGS. 8-11 showing example supports for coupling a connection panel to the rear portion of the interior of the enclosure.

FIG. 12 is a schematic perspective end view through an example end door 124 of the example enclosure 10 shown in FIGS. 8-11, showing example supports 126 coupled to the support barrier 110 for coupling a connection panel 104 in the rear portion 112 of the interior 14 of the enclosure 10. For example, the supports 126 may be configured to pivotally couple a connection panel 104 to the support barrier 110, for example, such that the connection panel 104 may be pivoted relative to the support barrier 110, which may facilitate installation and/or servicing by a technician (e.g., to facilitate connection of optical fibers to a rear side of the connection panels 104).

Figure 13:
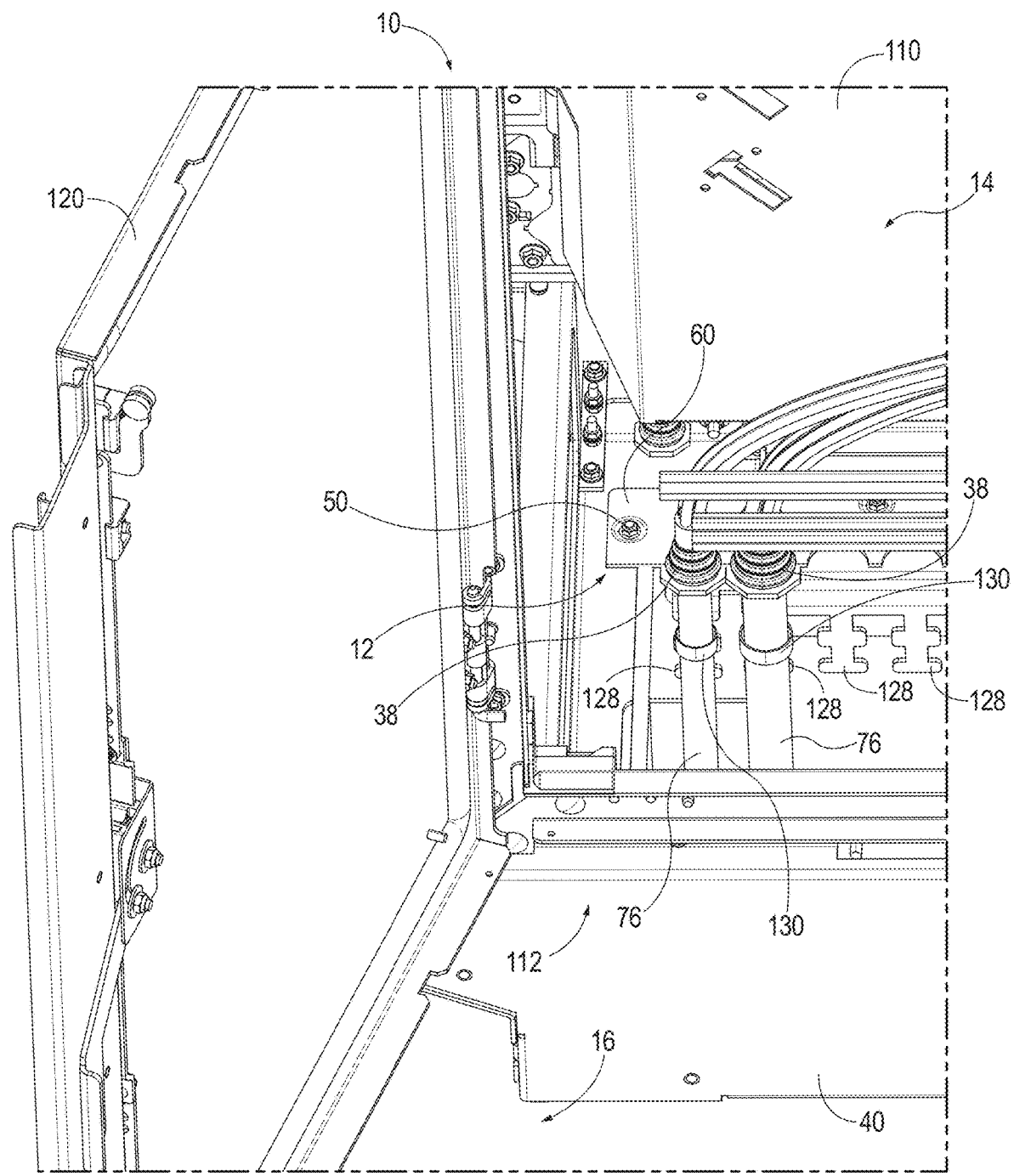
FIG. 13 is a schematic perspective rear view of the example enclosure shown in FIGS. 8-12 showing example coupling of the cables shown in FIG. 11 to respective example strain relief brackets via example hose clamps below a portion of the example entry module.

FIG. 13 is a schematic perspective rear view of the example enclosure 10 shown in FIGS. 8-12, showing an example coupling of the fiber optic cables 76 shown in FIG. 11 to respective example strain relief brackets 128 via example hose clamps 130. In the example shown, the fiber optic cables 76 are coupled to respective strain relief brackets 128 below the level of the entry module 12. The fiber optic cables 76 are routed from the exterior 16, for example, from under the enclosure 10, up through the opening 122 provided by the entry module 12 and into the interior 14 of the enclosure 10, for example, into the rear portion 112 of the enclosure 10 (or, in some examples, the front portion 108 of the enclosure 10). In the example shown, example seals 38 are provided around each fiber optic cable 76 and engage the apertures 72 of the entry module 12 (see FIGS. 6 and 7), for example, to provide a fluid- and/or dust-resistant seal between the fiber optic cables 76 and the entry module 12, to reduce the likelihood or prevent entry of fluid and/or dust into the interior 14 of the enclosure 10. In some examples, the strain relief brackets 128 may be configured to support the fiber optical cables 76 and reduce the likelihood or prevent damage to the fiber optic cables 76 resulting from excessive bending at the entry point of the fiber optic cables 76 into the enclosure 10. The hose clamps 130 may take the form of, for example, cable ties or the like.

Figure 14:
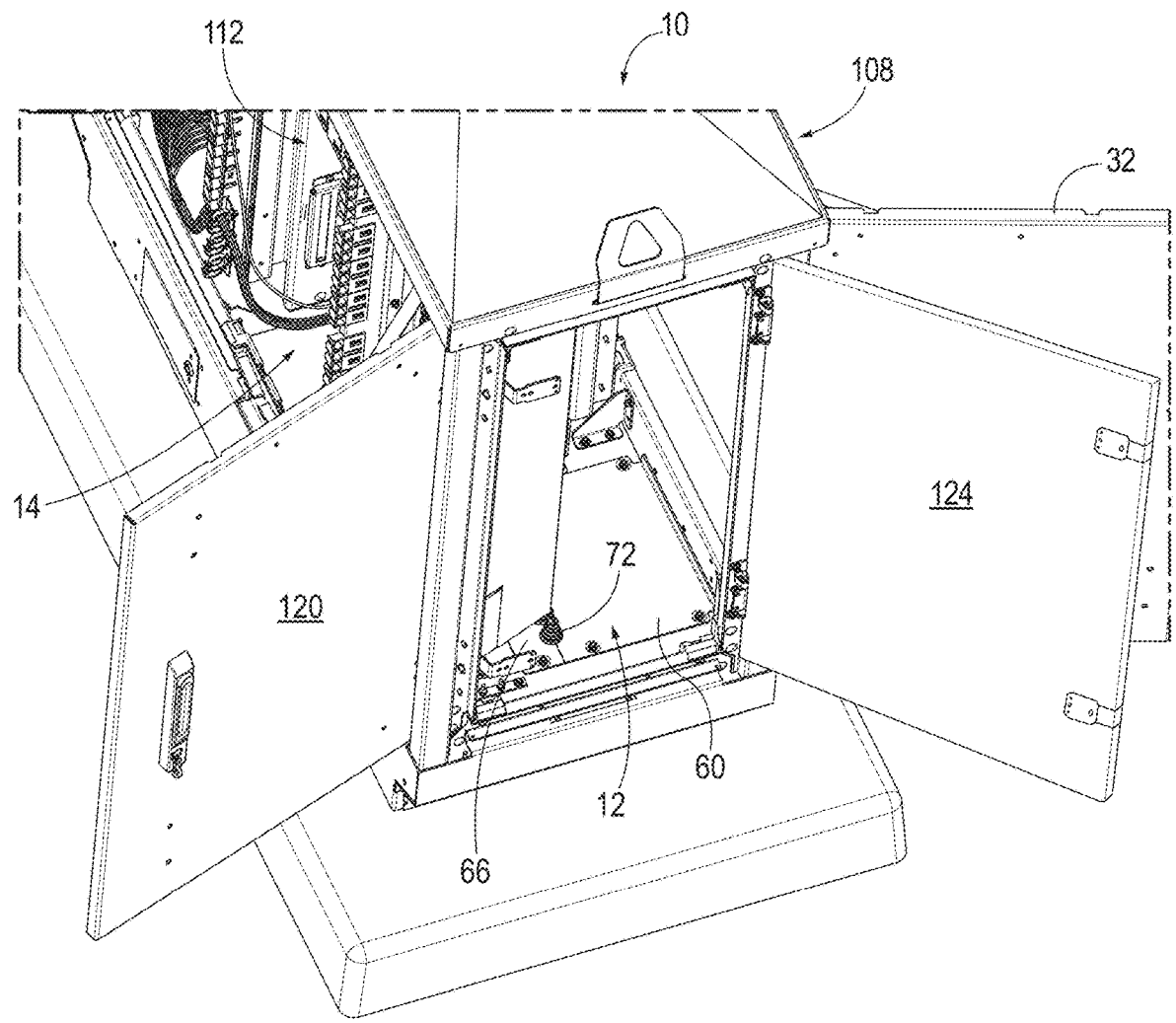
FIG. 14 is a schematic perspective end view through an example end door of the example enclosure shown in FIGS. 8-13 showing replacement of the example module plate of FIG. 10 to cover the example opening in the lower portion of the rear portion of the interior of the enclosure.

FIG. 14 is a schematic perspective end view through an example end door 124 of the example enclosure 10 shown in FIGS. 8-13, showing replacement of the example second module plate 66 (shown separated in FIG. 10), for example, to cover the example opening 122 in the lower portion of the rear portion 112 of the interior 14 of the enclosure 10. For example, the second module plate 66 may be associated with the first module plate 60 (see, e.g., FIGS. 6 and 7), such that the second module plate 66 and the first module plate 60 define the one or more apertures 72 through which the fiber optic cable(s) 76 pass from the exterior 16 of the enclosure 10 to the interior 14 of the enclosure 10.

Figure 15:
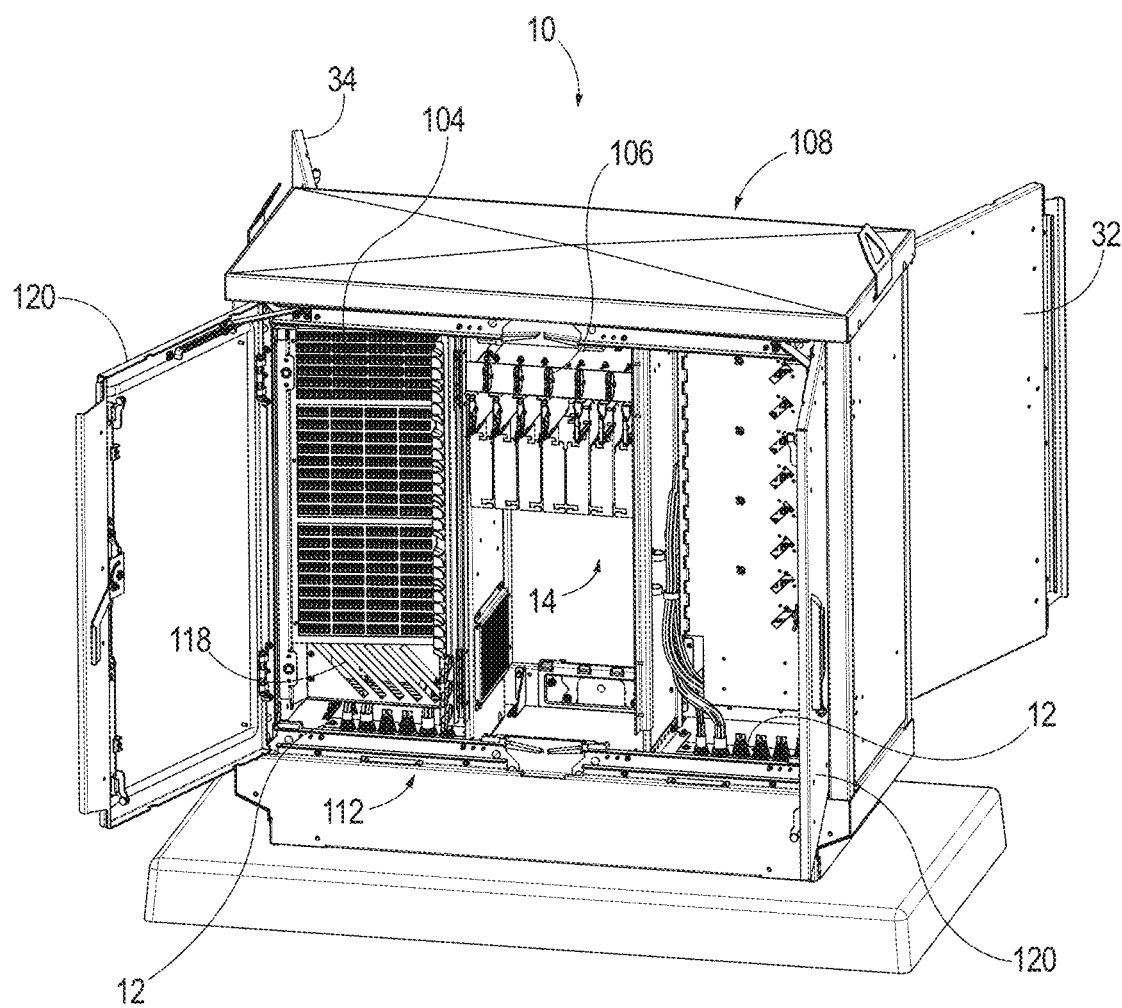
FIG. 15 is a schematic perspective rear view of the example enclosure shown in FIGS. 8-14 showing the example connection panel and example splitter module holder following installation in the rear portion of the interior of the enclosure.

FIG. 15 is a schematic perspective rear view of the example enclosure 10 shown in FIGS. 8-14, showing an example connection panel 104 and an example splitter module holder 106 following installation in the rear portion 112 of the interior 14 of the enclosure 10. In some examples, a second connection panel (not shown in FIG. 15) may be installed in the end of the rear portion 112 of the interior 14 of the enclosure 10 opposite the end of the enclosure 10 in which the example connection panel 104 shown in FIG. 15 is installed (e.g., the end on the right side of the rear portion 112 of the enclosure 10, as depicted in FIG. 15). For example, two connection panels may be installed in the rear portion 112, and each of the connection panels 104 may be configured to provide 432 communicative connections, although connection panels having other capacities are contemplated. In some examples, the rear portion of the enclosure 10 may facilitate doubling of the connection capacity of the enclosure 10, for example, relative to the connection capacity of the enclosure 10 when only the front portion 108 of the enclosure is used. Other levels of connection capacity increase are contemplated. In some examples, providing fewer or more connection panels in the rear portion 112 (and/or the front portion 108) is contemplated.

An example process for removing examples of the entry module 12 from an example enclosure 10 is now described. In some examples of the process, the enclosure 10 may include a frame 20 and a plurality of panels (e.g., exterior panels 22) coupled to the frame 20 and defining the interior 14 and the exterior 16 of the enclosure 10. In some examples, the entry module 12 may include a first module plate 60 and a second module plate 66 coupled to one another and defining at least one aperture 72 through which at least one cable 76 passes from the exterior 16 of the enclosure 10 to the interior 14 of the enclosure 10 to at least one respective connection point. In some examples, the process may include at least partially uncoupling one or more of the panels from the frame 20. The process may also include uncoupling the first module plate 60 (and/or the second module plate 66) from the enclosure 10 and/or uncoupling the first module plate 60 and the second module plate 66 from one another. In some examples, removable fasteners (e.g., fasteners 50 shown in FIGS. 2, 6, and 7) may couple the first module plate 60 to the enclosure 10, and/or removable fasteners may couple the first module plate 60 and the second module plate to one another 66. The removable fasteners may be removed, uncoupling the first module plate 60 from the enclosure 10, and uncoupling the first module plate 60 and the second module plate 66 from one another. In some examples, the first module plate 60 and/or the second module plate 66 may be removed from the enclosure 10 without disconnecting the one or more cables 76 from the at least one respective connection point in the interior of the enclosure 10.

In some examples of the process, uncoupling the first module plate 60 from the enclosure 10 may include uncoupling the first module plate 60 from the frame 20. For example, the first module plate 60 may be coupled to the frame 20 by removable fasteners, and the process may include removing the removable fasteners to remove the first module plate 60 from the frame 20. In some examples, the process may also include uncoupling the second module plate 66 from the enclosure 10 and removing the second module plate 66 from the enclosure 10 without disconnecting the one or more cables 76 from the at least one respective connection point in the interior in the enclosure 10.

In some examples, the process may include re-installing an entry module 12, for example, following repair and/or as part of replacing at least a portion of the entry module 12. In such examples, the process may include coupling the entry module 12 to the enclosure 10. In some examples, this may include coupling the first module plate 60 to the second module plate 66, such that the one or more respective cables 76 pass through the one or more apertures 72 defined by the first module plate 60 and the second module plate 66. The process may also include coupling the first module plate 60 to the enclosure 10 (e.g., before or after coupling the first module plate 60 to the second module plate 66) and coupling the one or more panels 22 to the frame 20, for example, with removable fasteners.

In some examples, a process for passing one or more optical fibers into an enclosure 10 configured to enclose in an interior 14 thereof one or more optical communication connections may include accessing the interior 14 of the enclosure 10. The interior 14 may be at least partially defined by a floor 48, opposing side panels 22, and a roof (e.g., a top panel 26 (FIG. 1)). The floor 48 may be at least partially defined by an entry module 12 including a module plate 66 and a portion from which the module plate 66 is separable (e.g., another module plate 60). The example process may also include separating the module plate 66 from the portion of the entry module 12 to provide an opening 122 between an exterior 16 of the enclosure 10 and the interior 14 of the enclosure 10. The example process may also include feeding one or more optical fibers through the opening 122 and into the interior 14 of the enclosure 10. The process, in some examples, may also include associating the module plate 66 with the portion of the entry module 12, such that the module plate 66 and the portion of the entry module 12 define an aperture 72 through which the one or more optical fibers pass from the exterior 16 of the enclosure 10 to the interior 14 of the enclosure 10.

Some examples of the process may further include placing a seal 38 around the one or more optical fibers and associating the seal 38 with the module plate 66, for example, such that the seal 38 provides at least one of a fluid-resistant seal or a dust-resistant seal between the one or more optical fibers, the module plate 66, and the portion of the entry module 12. In some examples of the process, the process may also include coupling at least some of the one or more optical fibers to a connection panel 104 configured to provide communication connections between the at least some optical fibers and other communication lines in the interior 14 of the enclosure 10. Some examples of the process may also include coupling the connection panel 104 to a support barrier 110 in the interior 14 of the enclosure 10. In some examples of the process, the process may also include coupling a portion of the one or more optical fibers to a strain relief bracket 128, for example, on a side of the entry module 12 opposite the interior 14 of the enclosure 10.

In some examples of the process, the enclosure 10 may include a support barrier 110 separating a front portion 108 of the interior 14 of the enclosure 10 from a rear portion 112 of the interior 14 of the enclosure 10 opposite the front portion 108 of the interior 14. For example, the front portion 108 of the interior 14 may include a first connection panel 104 configured to provide communication connections between at least some of the one or more optical fibers and other communication lines. In some such examples, accessing the interior 14 of the enclosure 10 may include accessing the rear portion 112 of the interior 14 of the enclosure 10. In some examples, separating the module plate 66 from the portion of the entry module 12 may provide an opening 122 between the exterior 16 of the enclosure 10 and the rear portion 112 of the interior 14 of the enclosure 10. In some examples, feeding the one or more optical fibers through the opening 122 and into the interior 14 of the enclosure 10 may include feeding the one or more optical fibers into the rear portion 112 of the interior 14 of the enclosure 10.

Some examples of the process may include coupling a second connection panel 104 to the support barrier 110 in the rear portion 112 of the interior 14 of the enclosure 10. In some such examples, the second connection panel 104 may be configured to provide communication connections between the one or more optical fibers and other communication lines. The process, in some such examples, may also include coupling at least some of the optical fibers to the second connection panel 104.

In some examples, a process for increasing a capacity of an enclosure 10 configured to enclose in an interior 14 thereof one or more fiber optic connections, may include accessing the interior 14 of the enclosure 10. The enclosure 10 may be at least partially defined by a floor 48, opposing side panels (e.g., exterior panels 22), and a roof (e.g., a top panel 26). In some examples, the floor 48 may be at least partially defined by an entry module 12, which may include a module plate 66 and a portion of the entry module 12 from which the module plate 66 is separable (e.g., another module plate 60). The process, in some examples, may also include separating the module plate 66 from a lower portion of the enclosure 10 to provide an opening 122 between an exterior 16 of the enclosure 10 and the interior 14 of the enclosure 10. The process may further include feeding a fiber optic cable 76 including one or more optical fibers through the opening 122 and into the interior 14 of the enclosure 10. The process, in some examples, may further include coupling an end of the fiber optic cable 76 to a connection panel 104 configured to provide optical communication connections between at least some of the one or more optical fibers of the fiber optic cable 76 with other optical fibers in the interior 14 of the enclosure 10.

In some examples, the process may further include associating the module plate 66 with the portion of the entry module 12, for example, such that the module plate 66 and the portion of the entry module 12 define an aperture 72 through which the fiber optic cable 76 passes from the exterior 16 of the enclosure 10 to the interior 14 of the enclosure 10. Some examples of the process may also include placing a seal 38 around the fiber optic cable 76 and associating the seal 38 with the module plate 66 and the portion of the entry module 12, for example, such that the seal 38 provides a fluid-resistant seal and/or a dust-resistant seal between the fiber optic cable 76, the module plate 66, and the portion of the entry module 12. In some examples, the process may also include coupling the connection panel 104 to a support barrier 110 in the interior 14 of the enclosure 10. For example, some examples of the enclosure 10 may include a support barrier 110 separating a front portion 108 of the interior 14 of the enclosure 10 from a rear portion 112 of the interior 14 of the enclosure 10 opposite the front portion 108 of the interior 14. In some such examples, the connection panel 104 may include a first connection panel 104 in the front portion 108 of the interior 14 of the enclosure 10 and configured to provide optical communication connections between a plurality of optical fibers. In some such examples, accessing the interior 14 of the enclosure 10 may include accessing the rear portion 112 of the interior 14 of the enclosure 10. In some such examples, separating the module plate 66 from the portion of the entry module 12 provides an opening 122 between the exterior 16 of the enclosure 10 and the rear portion 112 of the interior 14 of the enclosure 10. In some such examples, feeding the fiber optic cable 76 through the opening 122 and into the interior 14 of the enclosure 10 may include feeding the fiber optic cable 76 into the rear portion 112 of the interior 14 of the enclosure 10. In some such examples, the process may further include coupling a second connection panel 104 to the support barrier 110 in the rear portion 112 of the interior 14 of the enclosure 10, and coupling at least some of the optical fibers of the fiber optic cable 76 to the second connection panel 104.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method for passing a plurality of optical fibers into an enclosure configured to enclose in an interior thereof a plurality of optical communication connections, the method comprising:
accessing the interior of the enclosure, the interior at least partially defined by a floor, opposing side panels, and a roof, the floor at least partially defined by an entry module comprising first module plate and a second module plate, at least one of the first module plate or the second module plate being independently removable from the enclosure to provide an opening between an exterior of the enclosure and the interior of the enclosure, wherein the first module plate defines a first planar portion and the second module plate defines a second planar portion, wherein the first planar portion and the second planar portion are configured to abut one another such that the first planar portion and second planar portion are substantially coplanar;
separating the first module plate or the second module plate from the entry module to provide an opening between an exterior of the enclosure and the interior of the enclosure;
feeding the plurality of optical fibers through the opening and into the interior of the enclosure;
placing a seal around the plurality of optical fibers;
associating the first module plate with the second module plate, such that the first module plate and the second module plate at least partially define an aperture through which the plurality of optical fibers pass from the exterior of the enclosure to the interior of the enclosure; and
compressing the seal between the first planar portion and the second planar portion, such that the seal provides at least one of a fluid-resistant seal or a dust-resistant seal between the plurality of optical fibers and the entry module.

2. The method of claim 1, further comprising coupling at least some of the plurality of optical fibers to a connection panel configured to provide communication connections between the at least some optical fibers and other communication lines in the interior of the enclosure.

3. The method of claim 2, further comprising coupling the connection panel to a support barrier in the interior of the enclosure.

4. The method of claim 1, further comprising coupling a portion of the plurality of optical fibers to a strain relief bracket on a side of the entry module opposite the interior of the enclosure.

5. The method of claim 1, wherein the enclosure comprises a support barrier at least partially separating a front portion of the interior of the enclosure from a rear portion of the interior of the enclosure opposite the front portion of the interior, the front portion of the interior comprising a first connection panel configured to provide communication connections between at least some of the plurality of optical fibers and other communication lines, and wherein accessing the interior of the enclosure comprises accessing the rear portion of the interior of the enclosure.

6. The method of claim 5, wherein separating the first module plate from the second module plate provides the opening between the exterior of the enclosure and the rear portion of the interior of the enclosure.

7. The method of claim 5, wherein feeding the plurality of optical fibers through the opening and into the interior of the enclosure comprises feeding the plurality of optical fibers into the rear portion of the interior of the enclosure.

8. The method of claim 7, further comprising:
coupling a second connection panel to the support barrier in the rear portion of the interior of the enclosure, the second connection panel configured to provide communication connections between the at least some of the plurality of optical fibers and other communication lines; and
coupling at least some of the optical fibers to the second connection panel.

9. A system for communicatively coupling a plurality of optical fibers to one another, the system comprising:
an enclosure configured to enclose in an interior thereof a plurality of fiber optic connections, the enclosure comprising:
a floor at least partially defining a lower end of the enclosure and comprising an entry module coupled to the enclosure and configured to facilitate passage of at least one fiber optic cable into the enclosure, the entry module comprising a first module plate and a second module plate, at least one of the first module plate or the second module plate being independently removable from the enclosure to provide an opening between an exterior of the enclosure and the interior of the enclosure, wherein the first module plate defines a first planar portion and the second module plate defines a second planar portion, wherein the first planar portion and the second planar portion are configured to abut one another such that the first planar portion and second planar portion are substantially coplanar;
a seal configured to provide at least one of a fluid-resistant seal or a dust-resistant seal between a fiber optic cable and the entry module, when the seal is compressed between the first planar portion and the second planar portion; and
a support barrier at least partially separating a front portion of the interior of the enclosure from a rear portion of the interior of the enclosure opposite the front portion of the interior; and
a connection panel coupled to the support barrier in the front portion of the interior of the enclosure, the connection panel configured to provide optical communication connections between a plurality of optical fibers, wherein the at least one of the first module plate or the second module plate is located relative to the support barrier, such that the opening provides access from under the enclosure to the rear portion of the interior of the enclosure.

10. The system of claim 9, wherein the connection panel comprises a first connection panel, and the enclosure further comprises a second connection panel coupled to the support barrier in the rear portion of the interior of the enclosure, the second connection panel configured to provide optical communication connections between a plurality of optical fibers passing through the opening with other optical fibers in the interior of the enclosure.

11. The system of claim 9, wherein:
the first module plate comprises a first edge defining a first edge profile;
the second module plate comprises a second edge defining a second edge profile; and
the first module plate and the second module plate are configured to approach one another, such that the first edge profile and the second edge profile define an aperture therebetween configured to provide a passage through which a fiber optic cable passes from the exterior of the enclosure to the interior of the enclosure.

12. The system of claim 11, wherein the seal is configured to provide the at least one of a fluid-resistant seal or a dust-resistant seal between a fiber optic cable passing through the aperture, the first module plate, and the second module plate.

13. The system of claim 9, wherein the enclosure further comprises:
a first door configured to provide access to the front portion of the interior of the enclosure; and
a second door configured to provide access to the rear portion of the interior of the enclosure.

14. The system of claim 9, wherein the front portion of the interior and the rear portion of the interior of the enclosure are configured such that the rear portion facilitates increasing a connection capacity of the enclosure.

15. A method for increasing a capacity of an enclosure configured to enclose in an interior thereof a plurality of fiber optic connections, the method comprising:
accessing the interior of the enclosure, the enclosure defined by a floor, opposing side panels, and a roof, the floor at least partially defined by an entry module comprising a first module plate and a second module plate, at least one of the first module plate or the second module plate being independently removable from the enclosure to provide an opening between an exterior of the enclosure and the interior of the enclosure, wherein the first module plate defines a first planar portion and the second module plate defines a second planar portion, wherein the first planar portion and the second planar portion are configured to abut one another such that the first planar portion and second planar portion are substantially coplanar;
separating the first module plate or the second module plate from a lower portion of the enclosure to provide an opening between an exterior of the enclosure and the interior of the enclosure;
feeding a fiber optic cable comprising a plurality of optical fibers through the opening and into the interior of the enclosure;
placing a seal around the fiber optic cable and compressing the seal between the first planar portion and the second planar portion, such that the seal provides at least one of a fluid-resistant seal or a dust-resistant seal between the fiber optic cable and the entry module; and
coupling an end of the fiber optic cable to a connection panel configured to provide optical communication connections between at least some of the plurality of optical fibers of the fiber optic cable and other optical fibers in the interior of the enclosure.

16. The method of claim 15, further comprising associating the first module plate with the second module plate, such that the first module plate and the second module plate define an aperture through which the fiber optic cable passes from the exterior of the enclosure to the interior of the enclosure.

17. The method of claim 15, further comprising coupling the connection panel to a support barrier in the interior of the enclosure.

18. The method of claim 15, wherein:
the enclosure comprises a support barrier at least partially separating a front portion of the interior of the enclosure from a rear portion of the interior of the enclosure opposite the front portion of the interior;
the connection panel comprises a first connection panel in the front portion of the interior of the enclosure and configured to provide optical communication connections between a plurality of optical fibers; and
accessing the interior of the enclosure comprises accessing the rear portion of the interior of the enclosure.

19. The method of claim 18, wherein separating the first module plate from the second module plate provides the opening between the exterior of the enclosure and the rear portion of the interior of the enclosure.

20. The method of claim 18, wherein feeding the fiber optic cable through the opening and into the interior of the enclosure comprises feeding the fiber optic cable into the rear portion of the interior of the enclosure.

21. The method of claim 20, further comprising:
coupling a second connection panel to the support barrier in the rear portion of the interior of the enclosure, the second connection panel configured to provide optical communication connections between a plurality of optical fibers; and
coupling at least some of the optical fibers of the fiber optic cable to the second connection panel.

* * * * *